United States Patent
Bernabeu-Auban et al.

(10) Patent No.: US 7,607,142 B2
(45) Date of Patent: Oct. 20, 2009

(54) CANCELLATION MECHANISM FOR COOPERATIVE SYSTEMS

(75) Inventors: Jose M. Bernabeu-Auban, Sammamish, WA (US); Jeff L. Havens, Issaquah, WA (US); Yousef A. Khalidi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 698 days.

(21) Appl. No.: 11/129,848

(22) Filed: May 16, 2005

(65) Prior Publication Data

US 2006/0256797 A1 Nov. 16, 2006

(51) Int. Cl.
G06F 3/00 (2006.01)
G06F 9/44 (2006.01)
G06F 9/46 (2006.01)
G06F 13/00 (2006.01)
G06F 15/16 (2006.01)

(52) U.S. Cl. .................. 719/330; 719/315; 709/203

(58) Field of Classification Search ............. 719/313, 719/315, 320, 330; 709/201–203; 712/28
See application file for complete search history.

(56) References Cited

U.S. PATENT DOCUMENTS 5,956,509 A * 9/1999 Kevner .................. 719/330
6,138,251 A * 10/2000 Murphy et al. ............. 714/41
6,289,390 B1 * 9/2001 Kavner ................... 719/310
6,418,464 B1 * 7/2002 Minow .................... 709/203
7,233,972 B2 * 6/2007 Minow .................... 709/203
7,379,460 B2 * 5/2008 Balakrishnan ............ 370/392
2002/0062337 A1 * 5/2002 Minow .................... 709/203

OTHER PUBLICATIONS

Mitchell, J.G. et al., "An Overview of the Spring System", *Compcon: Digest of Technical Papers*, 1994, 39, 122-131.

* cited by examiner

*Primary Examiner*—Hyung S Sough
*Assistant Examiner*—Qing-Yuan Wu
(74) *Attorney, Agent, or Firm*—Woodcock Washburn LLP

(57) ABSTRACT

Object invocation may be carried out by one thread in a service which may include multiple executing threads. In a mechanism for implementing a cancellation operation in a cooperative system, a thread identifies an operation to be cancelled. A cancel function has an argument comprising the thread identifier in which the operation is to be cancelled. The cancel function is called by a client process thread to cancel a pending object invocation initiated by the client process. An immediate or hard cancel causes the targeted client and cancel thread to return immediately. A discretionary or soft cancel does not affect the targeted client thread. In either case the server process is notified via a maintenance notification. The target thread of the cancel cannot be reused for other work until the cancel request or notification has returned.

18 Claims, 4 Drawing Sheets

CANCELLATION MECHANISM FOR COOPERATIVE SYSTEMS

CROSS-REFERENCE TO RELATED CASES

This application is related in subject matter to U.S. patent application 11/130,301, entitled "Self-Registering Objects For An Inter-Process Communication Mechanism" filed herewith, U.S. Pat. No. 7,581,232, entitled "Coordinating Reference Counting Between Entities Executing Within Separate Address Spaces" filed herewith, U.S. Pat. No. 734,434,235, entitled "Type Server Caching the Proxy/Stub Generation filed herewith, U.S. Pat. No. 7,343,228, entitled "Structuring An Operating System Using A Service Architecture" filed herewith and U.S. patent application 11/130,300 entitled "Coordination of Set Enumeration Information Between Independent Agents" filed herewith.

FIELD OF THE INVENTION

The invention relates to communications between processes in computers and in particular to a cancellation mechanism.

BACKGROUND OF THE INVENTION

A standard way to communicate between two processes A and B (running on the same machine or running on different machines) is to send a message. Often, for example, it is desirable to enable process A to send a message to process B asking process B to execute code on behalf of process A. Typically, process A must have knowledge of a port or contact point for process B in order to do this.

One way to enable process A to call process B is via a remote procedure call (RPC). A remote procedure call enables a process on one computer to cause code to be executed in another process on the same or on a different computer, without requiring explicit code to be written by a developer or programmer to perform that particular call. An RPC is initiated by the caller process (client) sending a request message to a remote system or second process (server) to execute a certain procedure using supplied arguments. A result message is returned to the caller. For example, in a remote procedure call, a function call may be made by process A, in which the name of the procedure that process B is to execute on behalf of process A and a set of parameters for the procedure, are specified. Process B executes the code and returns a message to process A. When the code in question is written using principles of object-oriented programming, RPC is sometimes referred to as remote invocation or remote method invocation.

A remote procedure call typically follows a particular protocol (another way of saying this is "it uses a particular interface") so that potentially unrelated processes can communicate. The protocol or interface define the methods and the values which the processes agree upon in order to cooperate.

The procedure of transforming the function call into a message is called marshalling. Marshalling may include gathering data from one or more applications or non-contiguous sources in computer storage, putting the data pieces into a message buffer, and organizing or converting the data into a format that is prescribed for a particular receiver or programming interface. Marshalling typically converts what the code in process A sees as a function call into a message to be sent to process B. The message typically includes the name of the function and a set of parameters, coded in a way that process B understands. Process B receives the message and has to transform the message into a call to process B's internal function. The process of converting a message into a function call is called unmarshalling. The piece of code that performs marshalling in process A is called a proxy and typically resides in the client process. The corresponding piece of code on the server side that performs unmarshalling is called a stub.

Within the context of object oriented programming, process A and process B can be viewed as objects encapsulating data and functions. Some well-known technologies that take this approach are Sun Microsystem's JAVA and Microsoft's COM and DCOM. That is, process B may be viewed as a container for one or multiple objects, whose methods are the functions invoked by process A. In object oriented systems, therefore, process A invokes a method of a particular object of process B instead of invoking a function in process B. To do this, process A must have some way of identifying the object in process B that process A wishes to invoke.

The data stored in process A which enables process A to identify the object of process B is known as a reference to the object. The reference stores information concerning how to locate the object: that is, the reference must be sufficient to identify the process and within the process to identify the object whose method is to be invoked.

When process B provides a reference to one of its objects to process A and process A invokes that object, typically process B keeps track of that invocation. In fact, typically process B will keep track of how many invocations to the object are outstanding in all the processes to which a reference to the object has been provided. When there are no more outstanding invocations, process B may perform clean-up operations and so on, so that the information that there are no outstanding invocations to process B's object is information that process B would find interesting and helpful. Sometimes, however, after process A invokes process B's object, it may become necessary or desirable to cancel the invocation of that object. However, because time may elapse between the sending of the cancel request and the actual cancellation, a time window for another process to invoke the object is provided. Thus process B's invocation tracking information may be incorrect—process B may perform processing that should be done only when there are no more outstanding references to the object but in the meantime a new invocation may have been sent. That is, an improperly handled cancellation may create race conditions. It would be helpful if there were a mechanism that would prevent these inconsistencies.

SUMMARY OF THE INVENTION

An agent, service or process may request an operation by invoking an object that is implemented by another agent, service or process. Object invocation may be carried out by one thread in a service which may include multiple executing threads. After initiating the operation, the requesting agent may detect one or more conditions that make it advisable to cancel the requested operation. In a mechanism for implementing a cancellation operation in a cooperative system, a thread identifies an operation to be cancelled. A cancel function has an argument comprising the thread identifier in which the operation is to be cancelled. The cancel function is called by a client process thread to cancel a pending object invocation initiated by the client process. An immediate or hard cancel causes the targeted client and cancel thread to return immediately. A discretionary or soft cancel does not affect the targeted client thread. In either case the server process is notified via a maintenance notification. The target thread of the cancel cannot be reused for other work until the cancel request or notification has returned.

In a cooperative system, a request is carried out by performing an object invocation on a reference to an object implemented by another service. An object invocation is carried out by one thread within a service, by means of a message send/wait/receive cycle, in which the requesting thread, after sending the request message, waits for the target service to send back an answer message before it can proceed with its execution. A service may include several executing threads. Each incoming request to a service may be carried out by an individual thread. A thread within a service may carry out an external request. Individual threads within a service may be uniquely identified. To implement cancellation the operation to be cancelled is identified by the thread which is performing the operation. Within a service, any given thread requests at most one operation outside of the service. Thus, a cancel function within a service may take as its argument the thread whose operation needs to be cancelled.

A cancel invoke function is called by a client process thread to cancel a pending object invoke. The cancel invoke function targets a client thread and (optionally) a reference that the thread is operating on. A hard cancel causes the targeted client and cancel thread to return immediately. A soft cancel does not affect the targeted client thread. In either case the server process is notified via a maintenance notification. The target thread of the cancel cannot be reused for other work until the cancel request or notification has returned.

When the cancel invoke routine is called, it checks that the targeted thread is in the same process as the calling thread. It then acquires an operation lock and determines if the targeted thread is executing an operation. If an object was specified with the cancel call a check is also made to verify the operation is being done on the specified object. Next a check is made to see if the operation is still on the pending caller list. If this is the case then the operation is completed immediately and the client thread returns.

Next the cancel invoke allocates an operation structure and parameter memory to use for the notification cancel operation. The cancel thread references the operation and object. If the cancel is a hard cancel the function will set the hard cancel flag and the client event for the targeted thread which will cause it to return to the client process. Finally the operation lock is released.

Next the cancel thread will acquire the completion lock in the operation structure. The function can now check to see if the server thread has completed the request at this point. Also a check is made here to see if the targeted operation is itself a cancel operation. If it is a cancel operation or if the cancel pending flag is set then the cancel thread cleans up and returns. Canceling a cancel request with a hard cancel causes the original thread that that called the cancel function to return along with the calling thread. A soft cancel on a cancel request has no effect. Assuming the server thread was still acting on the operation, the cancel pending flag is set in the operation and the completion lock is released.

Next the operation is placed on the server process' cancel list, and the maintenance semaphore is signaled. Finally if this was not a hard cancel, the cancel thread will wait on the client event of the operation which it allocated. When the thread returns from the wait, it continues in the same way as a normal invoke completion. It first checks to see if the operation was cancel and if not then copies out the return status and cleans up the operation. When the server thread gets the cancel operation it checks to see if the operation to be canceled was completed and sets the delay completion flag. If not, the operation is treated like a normal invoke to the server process. The cancel parameters are copied into the process' buffers and the thread returns. The server process must respond to the cancel request by calling return from invoke.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
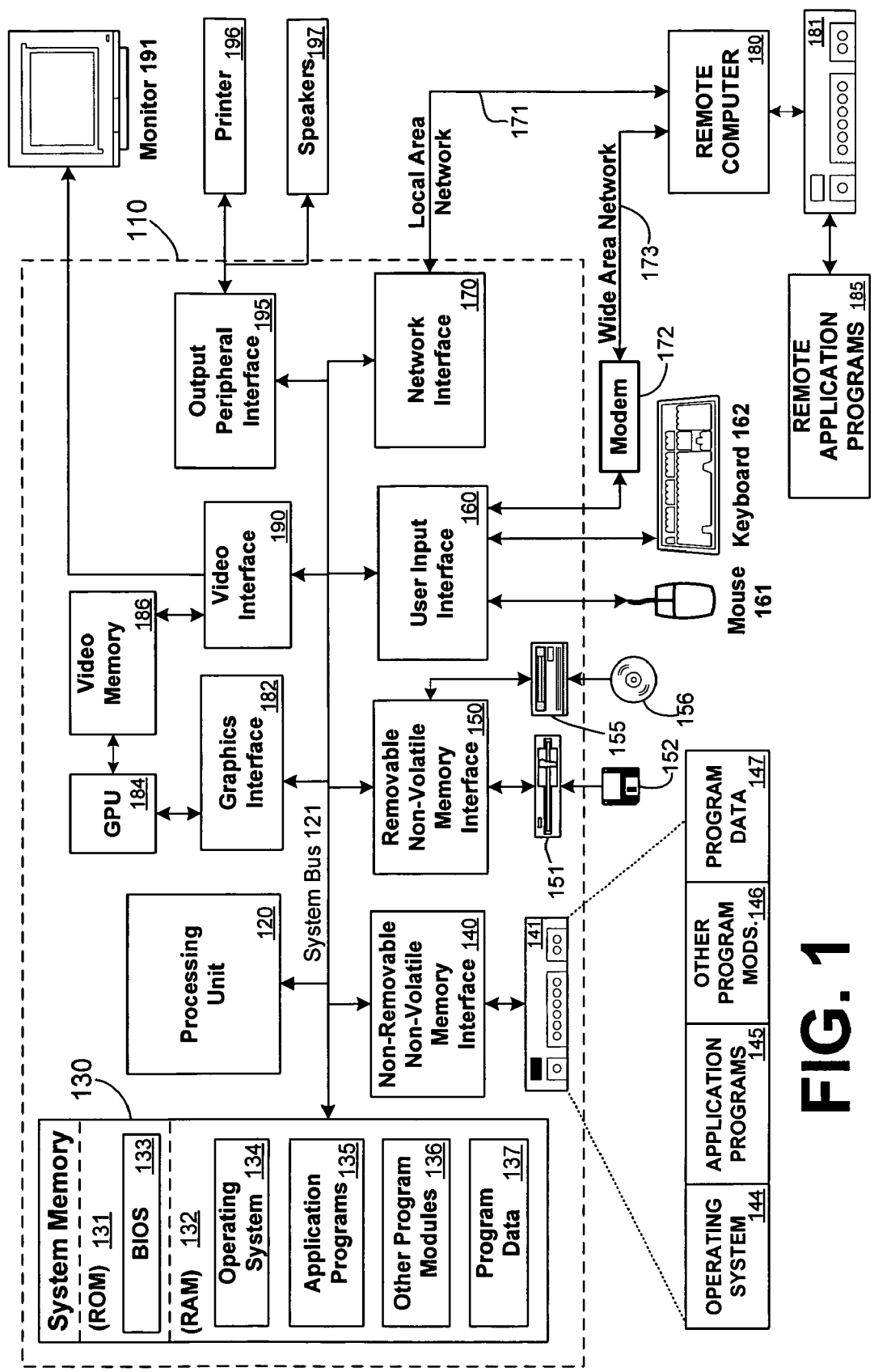
FIG. 1 is a block diagram showing an exemplary computing environment in which aspects of the invention may be implemented.

A process can be viewed as a container for a set of resources used when executing an instance of a program. A process typically includes a private virtual address space, (a set of virtual memory addresses that the process can use), an executable program defining initial code and data that is mapped into the process' virtual address space, a list of open handles or references to various system resources, such as semaphores, communication ports and files that are accessible to all threads in the process, a security context sometimes called an access token that identifies the user, security groups and privileges associated with the process, a unique identifier called a process ID and at least one thread of execution.

A thread is a path or route of execution within a process that runs independently or along with other threads to accomplish a task. Different threads may run on different processors, and may be able therefore to run simultaneously. In other systems, each thread takes turns with the other threads to get a processing time. This approach is called time-slicing. In the present invention, a process typically includes multiple threads, each thread identified by a thread identifier or thread ID, assigned by the process when the thread is created and agreed upon or known by the process and a trusted entity which mediates communications between processes. Hence for two processes, process A and and process B, process A may include thread 1 and thread 2 and process B may include thread 3 and thread 4. U.S. patent application Ser. No. 11/130, 301 entitled "Self-Registering Objects For An Inter-Process Communication Mechanism" filed herewith, U.S. Pat. No. 7,581,232 entitled "Coordinating Reference Counting Between Entities Executing Within Separate Address Spaces" describe systems and methods for referencing objects in one process from another process, and tracking outstanding references to those objects. The present invention describes a cancellation mechanism which enables a method invocation on an object in one process to be cancelled without creating a race condition.

For example, suppose process A has a reference to an object (e.g., object 1) in process B. Suppose further that thread 1 of process A determines to invoke a method for object 1. The method invocation performed by thread 1 may be intercepted by a trusted entity, which may issue a command to thread 3 of process B to perform the actual invocation. Suppose now that thread 3 is operating on some request from object 1. Process A may decide for various reasons that the operation is no longer desirable. Perhaps the operation is taking too long, or perhaps the conditions prompting the operation request have changed.

Suppose that, for whatever reason, process A decides to cancel the operation invoked on object 1 and being performed by thread 3. In synchronous operations, while thread 3 is working on the operation, thread 1 is in an inactive state, waiting until the operation is done. Therefore, to cancel the operation, another thread is needed to process the cancel operation. The trusted entity may be called to determine what object thread 1 has invoked, what process the object belongs to, and what thread in that process is running the operation. Suppose the trusted entity determines that thread 1 has invoked object 1 belonging to process B and that the thread in process B running the operation is thread 3. The trusted entity may send a request over to process B to thread 4 to cancel the operation being performed on object 1 by thread 3. Thread 4 may then determine the state of the operation being performed by thread 3 and return a status of unknown or uncancelable or cancelable. If the state returned is cancelable, the cancel is performed and thread 1 is released to do more work. If the state returned is unknown or uncancelable, thread 1 is not released and the process is repeated until the status becomes cancelable. In this manner, race conditions (where thread 1 is released and goes on to perform a different task) are prevented. In race conditions, the wrong operation could be canceled.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through, a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Cancellation Mechanism for Cooperative Systems

Figure 2:
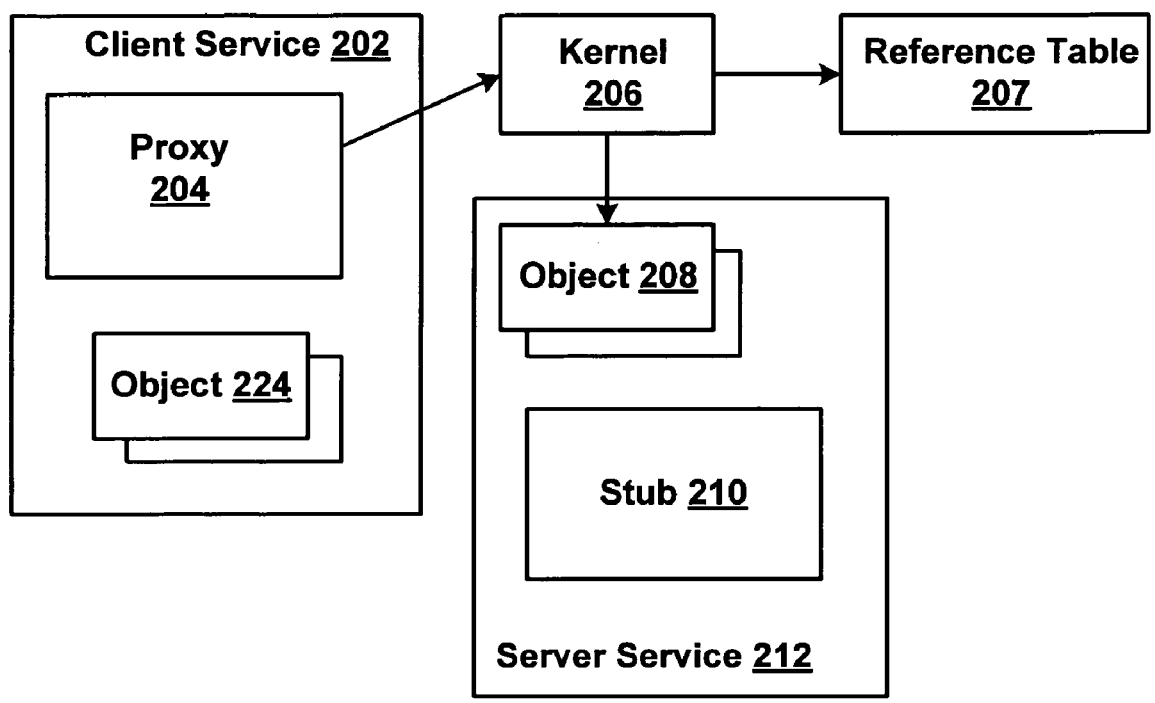
FIG. 2 is a block diagram illustrating an operating system whose architecture is based on a service model in accordance with one embodiment of the invention.

FIG. 2 is a block diagram illustrating the relationship of services in a service-based operating system in accordance with some embodiments of the invention. The operating system or portions thereof may reside on or may access one or more computers such as computer 110 described with respect to FIG. 1.

In some embodiments of the invention, the operating system includes entities that are processes, agents, services, components or modules comprising containers for objects or resources that are described through interfaces. FIG. 2 illustrates an exemplary "client" service 202 and an exemplary "server" service 212, although it will be appreciated that any number of client services and server services may exist in the operating system. Moreover, a "client" service in one interaction may act as a "server" service in another: that is, "client" and "server" terminology refers to roles within a particular interaction rather than to intrinsic differences in hardware, software, and so on. Each service may be implemented through the use of one or more objects. For example, in FIG. 2, the client service 202 includes a proxy object 204. The client service 202 may also include one or more other objects or resources, as represented by object 224. Similarly, the server service 212 may include a stub 210 and one or more objects, as represented by object 208. A service may require support from one or more other services and the code specifying the service may require the loading of specific run-time support to run correctly. Services may reside in the same address space in the local machine or in a computer of a computer network. Services alternatively may reside in different address spaces in the local machine or on different computers of a computer network.

A trusted entity may be viewed as a unique distinctive process, module, component, agent or service that mediates communications between processes in the system. In some embodiments the trusted entity is able to distinguish between data parameters and reference parameters in messages passed between processes. In some embodiments the trusted entity has a trusted channel to every agent, service, module, component or process for mediating resource access and reference. Communications with the trusted entity therefore are secure, meaning that processes other than the trusted entity are unable to access or modify transmissions or messages sent between processes. Moreover, the trusted entity may be capable of identifying the originator of a message.

In some embodiments of the invention, the trusted entity is the kernel 206. The kernel 206 can implement and expose its objects (not shown) to other services, such as to services 202 and 212 in FIG. 2. In some embodiments of the invention, the kernel 206 is trusted code. In some embodiments of the invention, the only trusted code is the kernel 206. In some embodiments, to avoid forgery of object references, only trusted code is able to manipulate an object reference. Hence in some embodiments of the invention, only the kernel 206 is able to manipulate an object reference. A service that holds a reference to an object refers to the reference by a representation referred to herein as a reference or as a local reference id. In some embodiments of the invention, the local reference id is understood only by the kernel 206. Hence, for example, a communication sent by client service 202 to a server service 212 invoking a method of object 208 would be mediated by kernel 206. Kernel 206 in some embodiments of the invention, creates and maintains one or more reference tables, as represented by reference table 207 in FIG. 2, to resolve the object reference received from client service 202 to the address of an object 208 to be invoked.

A service may communicate with another service by sending a method invocation to another object via an object reference (e.g., via a remote call). All communications among services are assumed to be and are treated as though they are remote. The client and server services may be in separate (remote) containers or may be co-located in the same container but in either case, the semantics of the call is remote.

A service interface may be specified in an interface definition language or via a contract. In some embodiments of the invention, a subset of an existing language, such as but not limited to C#, is used to define the contract. In some embodiments of the invention, a subset of the application implementation language, such as but not limited to C#, is used to define the interfaces. A service written in C# therefore will seamlessly integrate with the C# contract without requiring the mapping necessitated in traditional systems which use an IDL language for contracts. Services written in other languages such as for example, unmanaged C++ may have a translation table which maps constructs from the C# interface to constructs in C++. Resultant C++ services can interoperate with the C# service as long as the system service model and interface definitions are not violated.

Services may be mapped in a one to one relation to an address space. If such is the case, protection ensues as a consequence of the address space provided by the memory management unit. Alternatively, in some embodiments, multiple services can be located within the same address space. In this case, protection is obtained by a managed code run-time (such as, for example, Microsoft's CLR or Common Language Runtime). Services communicate with each other independent of their location.

Failure and security boundaries in the system may exist at the service level and may be reinforced by hardware protection at the address space and machine levels. Service recovery actions including the ability to restart, and dependency tracking are provided by the operating system. Optimizations may accrue for services that are located within the same address space.

A method invocation can only be interpreted by the receiving object. The receiving object decides what action or actions are to be taken, based on the information passed with the invocation. The information passed may include specific data structures and/or references the invoker passes to the object being invoked.

The set of invocations an object accepts through a particular reference and the way the object is supposed to react to such an invocation is referred to as the interface supported by the object through that reference. Hence, the kernel will not necessarily know what the particular interface implemented by a referenced object is and does not need access to that information. It will be appreciated that it is possible to have different references designating the same object implementation through different interfaces.

An object in some embodiments is an implementation of an interface within some service and is an independent unit of failure. An object may be expressed and coded in any programming language capable of passing parameters and control.

An object reference in some embodiments identifies the object to which the reference refers and is not able to be forged. A reference confers to the holder the authority to invoke any of the methods of the interface for which the reference to the object was created. An object reference may be revoked and may be passed (optionally with restrictions) to another service or to other services as an argument of an invocation or as return results.

Use of an interface so defined enables the definition of a class implementing the interface and whose method implementations are stubs which perform the task of parameter marshalling. Instances of such a class are herein referred to as proxies, the proxies sitting in for the actual objects to which they refer and having the same interface.

In some embodiments of the invention, a cancellation mechanism correctly handles race conditions that may arise when an operation invoked by one process on an object in another process must be cancelled. A system for providing the cancellation mechanism may include one or more processes, entities, agents or services including one or more objects or resources that may be shared with one or more other processes, agents or services. The system may also include one or more tables for storing information about shared objects or resources, and/or an independent entity, process, service or agent that mediates communications between processes, entities, agents or services.

Figure 3:
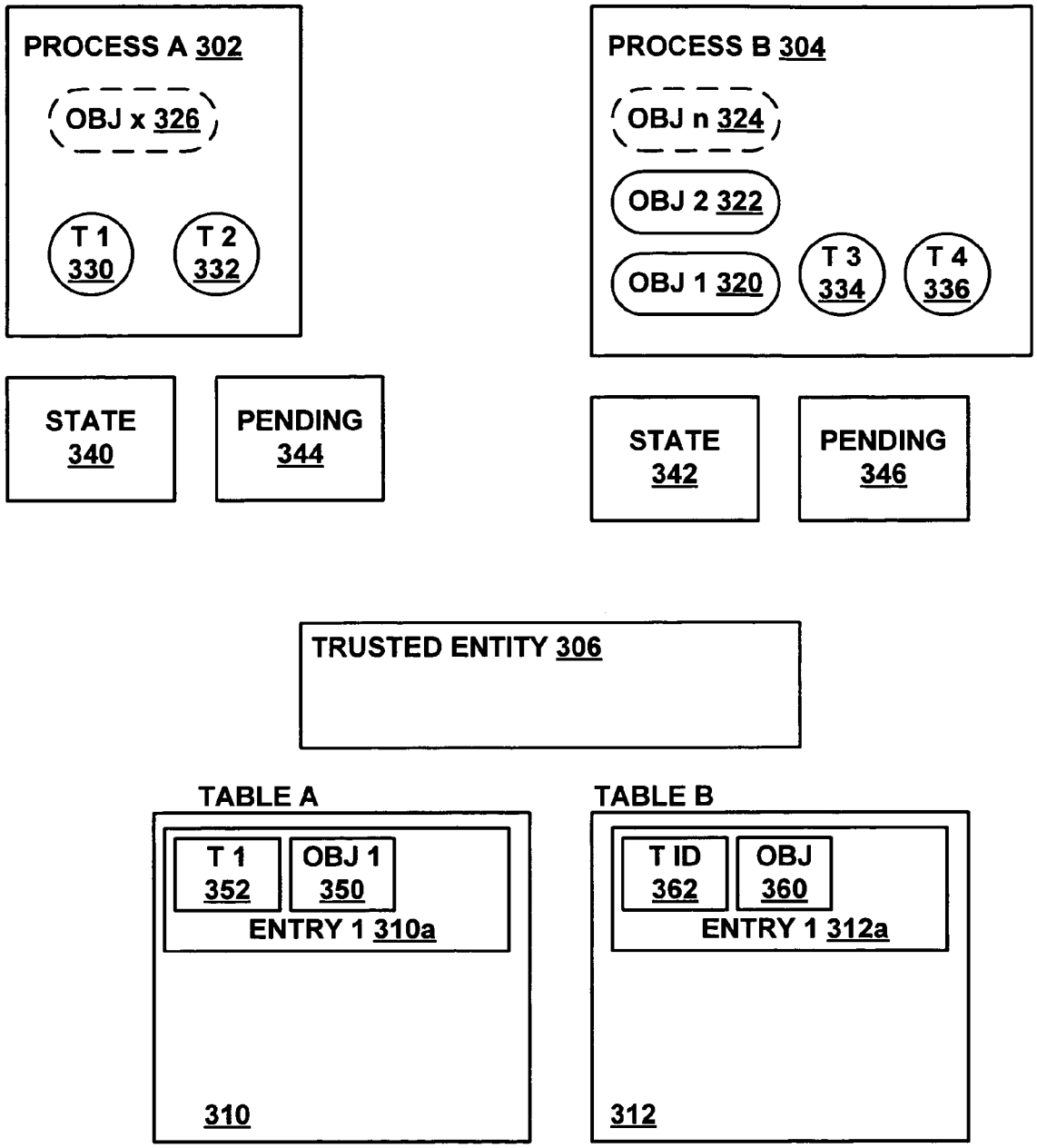
FIG. 3 is a block diagram of a system for cancellation of operations in accordance with one embodiment of the invention.

FIG. 3 is a block diagram of an exemplary cancellation mechanism in a cooperative system in accordance with one embodiment of the invention. The cancellation mechanism of FIG. 3 may reside on a computer such as computer 110 described above with respect to FIG. 1.

A cancellation mechanism may comprise one or more of the following components: one or more processes, one or more threads, one or more tables and a trusted entity. The trusted entity may be associated with one or more tables. In FIG. 3 process A includes thread 1 330 and thread 2 332. In FIG. 3 process A 302 is acting as a client process but it will be appreciated that process A 302 may also act as a server in another interaction. Process A 302 may also include a state table 340 for threads in process A 302. Process A 302 may also include a pending operation list 338. Similarly, exemplary process B includes thread 3 334 and thread 4 336. In FIG. 3 process B 304 is acting as a server process but it will be appreciated that process B 304 may also act as a client in another interaction. Process B 304 may also include a state table 342 for threads in process B 304. Process B 304 may also include a pending operation list 340. Process A 302 and process B 304 may include one or more objects.

In FIG. 3, process B 304 as illustrated includes object 1 320, object 2 322 . . . . object n 324. Similarly, process A 302 as illustrated in FIG. 3 includes exemplary object x 326, although it will be appreciated that process A 302 and process B 304 may include any number of objects. Process A 302 may export one or more of its objects (e.g., object x 326) to other processes (e.g., to process B 304). Similarly, process B 304 may export one or more of its objects (e.g., one or more of objects: object 1 320, object 2, 322 . . . object n 324) to other processes (e.g., to process A 302). Process A 302 may import or reference an object that has been exported to it (such as, for example, one or more of objects object 1 320, object 2 322 . . . object n 324) exported to it by other processes (such as, for example, by process B 304). Similarly, process B 304 may import or reference an object (such as, for example, object x 326) exported to it by other processes (such as, for example, by process A 302). A process that exports an object reference may be referred to as an originating process. A process that receives an object reference to an exported object may be referred to as a receiving process.

Trusted entity 306 in some embodiments of the invention mediates communications between processes such as those between process A 302 and process B 304 and vice versa. In some embodiments of the invention, trusted entity 306 is the kernel of an operating system. A trusted entity 306 may provide a secure channel of communication between processes and may be able to identify the sender of a message that it receives. In some embodiments of the invention, the operating system is an operating system such as the one described above with respect to FIG. 2. The trusted entity 306 in some embodiments of the invention is able to determine what object a thread has invoked, what process the object belongs to and what thread in the server process is running an invoked operation.

The trusted entity 306 may receive or intercept communications between processes and may maintain a table of information associated with each process in the system. In some embodiments of the invention, a table is maintained by the trusted entity 306 for each process (e.g., process A 302 and process B 304 of FIG. 3). Table 310 of FIG. 3 illustrates an exemplary table that trusted entity 306 maintains for process A 302. Table 310 may include a client table comprises at least one client table entry comprising a client thread identifier (352) of a thread in the client process and an object (350) invoked by the client threat. Table 312 illustrates an exemplary table that trusted entity 306 maintains for process B 304. Table 312 may include a server table comprises at least one server table entry comprising a server thread identifier (362) of a thread in the server process and an object (360) invoked by the client thread. Tables maintained by the trusted entity for a process may include one or more entries (310*a*, 312*a*) (which include one or more of the following items: an object identifier, an indicator which identifies if the object is an imported object or an exported object, a thread identifier (thread ID) of a thread that invokes an operation on an imported object, a thread identifier (thread ID) of a thread that operates on an exported object, an index (even numbered index indicates the object is an exported object, odd numbered index indicates the object is an imported object), a location of the object in the originating process and an identification of the process to which the object was exported or from which the object was imported.

Figure 4:
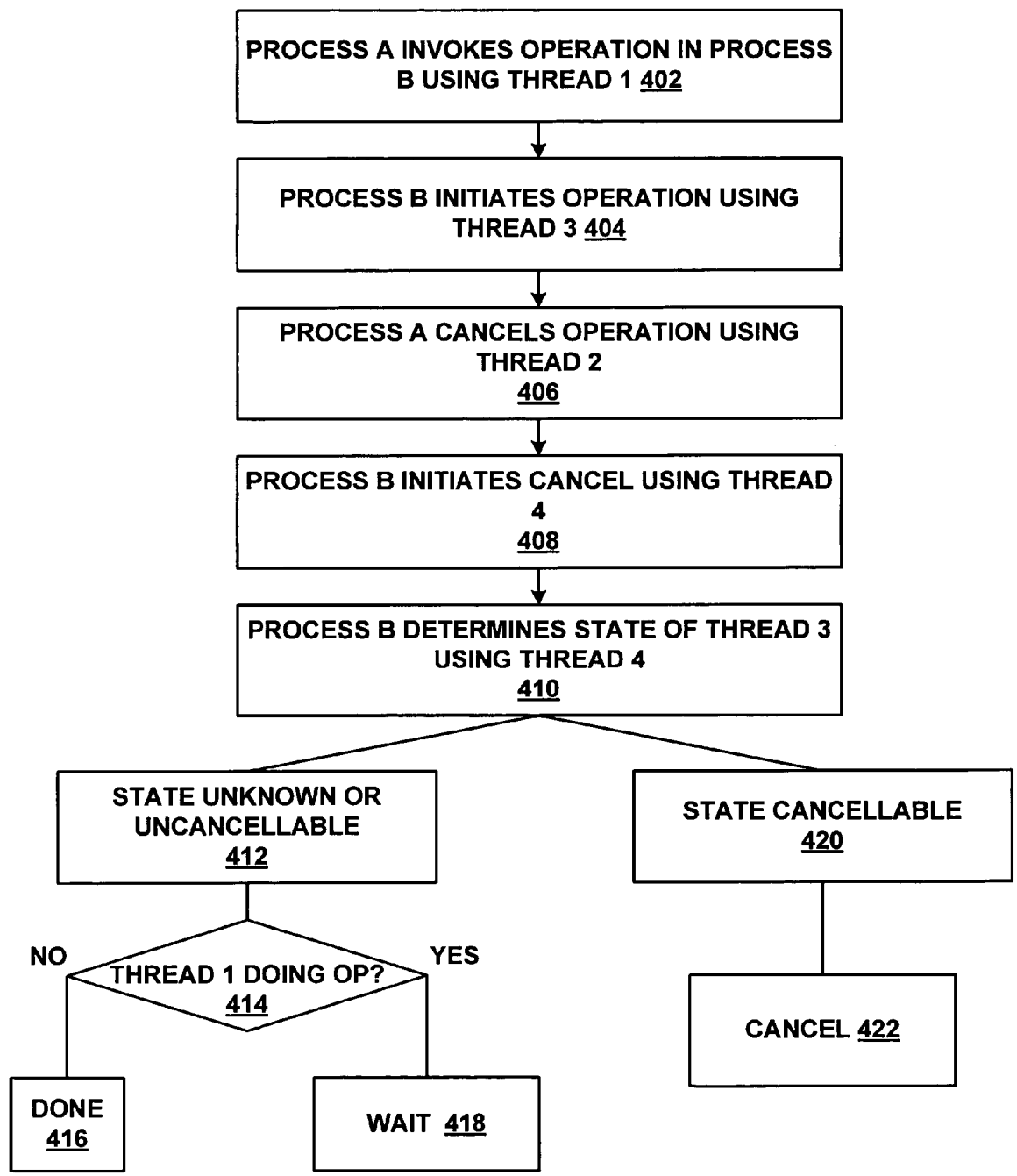
FIG. 4 is a flow diagram of a method for canceling operations in accordance with one embodiment of the invention.

FIG. 4 illustrates an exemplary method for cancellation in accordance with some embodiments of the invention. At step 402 a client process may send a method invocation to a server process. For example, suppose process A 302 has a reference to an object (e.g., object 1 320) in process B 304. Suppose further that thread 1 330 of process A 302 determines to invoke a method for object 1 320. The method invocation performed by thread 1 330 may be mediated by a trusted entity 306. The trusted entity 306 may create an entry in table A 310 that the trusted entity 306 maintains for process A 302, in which is stored the information that an operation on object 1 (320) has been invoked by thread 1 (330). The trusted entity may pass the message from process A 302 to process B 304. At step 404 the server process may initiate a thread to perform the method invocation. For example, process B 304 may assign thread 3 334 the job of invoking object 1 320. The trusted entity 306 may create an entry in table B 312 for thread 3 334 indicating that a method on object 1 320 is being invoked by thread 3 334.

While thread 3 334 is operating on object 1, 320, thread 1 330 in process A 302 is in a wait state, waiting for thread 3 334 to return a result to it. At 406 the client process may decide to cancel the invoked operation in the server process. For example, process A 302 may decide for various reasons that the operation invoked on object 1 320 by thread 1 330 is no longer desirable. Suppose that, for whatever reason, process A 302 decides to cancel the operation invoked on object 1 320 and being performed by thread 3 334 in process B 304. The trusted entity 306 may be called to cancel the operation that thread 1 330 is working on. The trusted entity 306 may then determine (from table 310 and table 312) what object thread 1 is working on (object 1 320), what process object 1 320 belongs to and what thread is working on that object (thread 3 334). The trusted entity may then send a request to process B 304 telling process B 304 that it should cancel the operation operating on object 1 320 that was invoked by thread 3 334. At 408 the server process may initiate a cancel using another thread. For example, thread 4 336 may be assigned the task of canceling the operation being worked on by thread 3 334. At 410 the state of the operation on the object being performed in the server process may be determined. For example, process B 304 may access state table 342 to determine the state of the operation being performed by thread 3 334.

Possible states for the operation being performed by thread 3 334 are: unknown/uncancelable or cancelable. An unknown status may be returned if, for example, thread 3 334 has not started doing any work yet or has completed its work. An unknown status may also be returned if a race condition exists. An unknown status may indicate that there is no information stored in the state table for server process (table 342). An uncancelable state is programmatically determined and thus may indicate that cancellation at this time would be too difficult to unroll (stop and return state to a pre-operation condition). A cancelable state means that the cancel can be performed. If at 420 the state is determined to be cancelable, the operation in the server process is cancelled (422) and a cancel result is returned to the client process. That is, if the state for thread 3 334 is determined by thread 4 336 to be cancelable, then thread 4 336 cancels the operation being performed by thread 3 334, returns "success" and thread 3 is released. If at 412 the state is determined to be uncancelable or unknown, a result of "unknown" is returned to the client process (e.g., to thread 2). The state of the invoking thread in the client process is then determined at 418. For example thread 2 332 then checks the state of thread 1 330 by accessing state table 340. If the client thread is no longer operating then the process is essentially complete (416). If thread 1 330 is no longer doing the invoke operation then the operation has been successfully completed or has been successfully cancelled (414). If the operation was cancelled, thread 1 330 has to wait until the result comes back from thread 3 334 (418). When the result comes back thread 1 330 can be released. If thread 1 330 were released before thread 3 334 comes back thread 1 330 could go on to do other work and then have the wrong job cancelled. If thread 1 330 is still working, a cancel operation is sent and then thread 2 332 waits until a reply is received. The cancellation process just described is referred to as a soft cancel because if the server process does not want to perform the cancel, it is not forced to—instead the operation can continue. In a hard cancellation, the client thread is released immediately. It will be apparent to one of skill in the art that while only two processes are described above, the invention as contemplated is not so limited. When more than two processes are involved in the cancellation mechanism chaining of the cancellation process will occur.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. An inter-process cancellation system comprising a processor operatively coupled to a computer readable storage medium including computer executable instructions that, when executed, cause the system to carry out the following method:
   executing a client process to send a message invoking an operation on an object in a server process, using a first client thread;
   executing the server process;
   invoking a cancel operation on the first client thread using a second client thread to cancel the operation invoked using the first client thread;
   initiating a first server thread of the server process to perform the operation on the object;
   initiating the cancelling of the operation to be performed by the first server thread in the server process using a second server thread as a result of invoking the cancel operation;
   determining a state of the first server thread via the second server thread as a result of initiating the cancelling of the operation; and
   using a trusted entity to facilitate the sending of the message and invocation of the cancel operation and to maintain a client process table and a server process table, wherein the client process table comprises at least one client thread identifier identifying the first client thread in the client process and the object invoked by the first client thread, and the server process table comprises at least one server thread identifier identifying the first server thread in the server process and the object invoked by the client thread.

2. The system of claim 1, further comprises instructions for using a state table for the client thread.

3. The system of claim 2, wherein a state of the client thread comprises inactive.

4. The system of claim 2, wherein a state of the client thread comprises active.

5. The system of claim 1, further comprises instructions for using a state table for the server thread.

6. The system of claim 5, wherein a state of the server thread comprises unknown.

7. The system of claim 5, wherein a state of the server thread comprises uncancelable.

8. The system of claim 5, wherein a state of the server thread comprises cancelable.

9. A method for correctly canceling an operation comprising: sending a message from a client process invoking an operation on an object in a server process, using a first client thread;
   initiating a first server thread of the server process to perform the operation on the object;
   invoking a cancel operation on the first client thread using a second client thread to cancel the operation invoked using the first client thread;
   initiating the cancelling of the operation to be performed by the first server thread in the server process using a second server thread as a result of invoking the cancel operation;

determining a state of the first server thread via the second server thread as a result of initiating the cancelling of the operation;

facilitating the sending of the message and invocation of the cancel operation by using a trusted entity to uniquely identify each one of the client and server threads, associating process of each one of the client and server threads, and relationship of each one of the client and server threads with the object.

10. The method of claim 9, further comprising:

in response to determining that the state of the first server thread is unknown, determining if the first client thread is inactive.

11. The method of claim 10, further comprising:

in response to determining that the first client thread is inactive, determining whether a cancel operation message was received by the client process from the server process.

12. The method of claim 11, further comprising:

in response to determining that the client process received the cancel operation message from the server process, releasing the first client thread.

13. The method of claim 10, further comprising:

in response to determining that the first client thread has received a cancel operation message, releasing the first client thread.

14. The method of claim 9, further comprising:

in response to determining that the state of the first server thread is cancelable, sending a cancel message to the first client thread.

15. A computer-readable storage medium comprising computer-executable instructions to be executed by a processor to perform the following method:

sending a message from a client process invoking an operation on an object in a server process, using a first client thread;

initiating a first server thread of the server process to perform the operation on the object;

invoking a cancel operation on the first client thread using a second client thread to cancel the operation invoked using the first client thread;

initiating the cancelling of the operation to be performed by the first server thread in the server process using a second server thread as a result of invoking the cancel operation;

determining a state of the first server thread via the second server thread as a result of initiating the cancelling of the operation;

facilitating the sending of the message and invocation of the cancel operation by using a trusted entity to uniquely identify each one of the client and server threads, associating process of each one of the client and server threads, and relationship of each one of the client and server threads with the object.

16. A computer-readable storage medium of claim 15, comprising further computer-executable instructions for:

in response to determining that the state of the first server thread is unknown, determining if the first client thread is inactive.

17. A computer-readable storage medium of claim 16, comprising further computer-executable instructions for:

in response to determining that the first client thread is inactive, determining whether a cancel operation message was received by the client process from the server process.

18. A computer-readable storage medium of claim 17, comprising further computer-executable instructions for:

in response to determining that the client process received the cancel operation message from the server process, releasing the first client thread.

* * * * *